US012499429B2

(12) United States Patent
Ujita et al.

(10) Patent No.: US 12,499,429 B2
(45) Date of Patent: Dec. 16, 2025

(54) AUTOMATED TELLER MACHINE (ATM) EXCEPTION IDENTIFICATION AND ANALYSIS

(71) Applicant: Bank of America Corporation, Charlotte, NC (US)

(72) Inventors: Daryl K. Ujita, Alhambra, CA (US); Cindy L. Cliff, Howell, MI (US); Jane M. Lauritzen, Seattle, WA (US); Adam L. Newell, Land O Lakes, FL (US); Joshua J. White, Terrell, TX (US); Alex Ledezma, Grand Prairie, TX (US); Troy B. Hook, Spokane, WA (US); Purvi Jariwala, Tampa, FL (US); Chanda Jill Cross, Rockwall, TX (US)

(73) Assignee: Bank of America Corporation, Charlotte, NC (US)

( * ) Notice: Subject to any disclaimer, the term of this patent is extended or adjusted under 35 U.S.C. 154(b) by 28 days.

(21) Appl. No.: 18/671,397

(22) Filed: May 22, 2024

(65) Prior Publication Data

US 2025/0363473 A1    Nov. 27, 2025

(51) Int. Cl.
*G06Q 20/10*    (2012.01)

(52) U.S. Cl.
CPC ................................ *G06Q 20/1085* (2013.01)

(58) Field of Classification Search
CPC .................................................. G06Q 20/1085
See application file for complete search history.

(56) References Cited

U.S. PATENT DOCUMENTS

| 6,726,097 | B2 | 4/2004 | Graef et al. |
| 7,377,425 | B1 | 5/2008 | Ma et al. |
| 7,974,922 | B1 * | 7/2011 | Hecht, Jr. ............ G06Q 20/042 |
| | | | 705/45 |
| 8,169,602 | B2 | 5/2012 | Jones et al. |
| 8,225,989 | B1 | 7/2012 | Turocy et al. |
| 8,231,049 | B2 | 7/2012 | Agrawal |

(Continued)

FOREIGN PATENT DOCUMENTS

| IN | 476KO2010 A | * 11/2010 | ......... G06Q 20/1085 |
| WO | WO-2014117240 A1 | * 8/2014 | ............. G06Q 40/02 |

OTHER PUBLICATIONS

Iven. Amber: 5 Common ATM error and How to Fix Them, Jun. 29, 2021, ATM Depot, pp. 1-10 (Year: 2021).*

(Continued)

*Primary Examiner* — Bijendra K Shrestha
(74) *Attorney, Agent, or Firm* — Banner & Witcoff, Ltd.

(57) ABSTRACT

Arrangements for identifying, analyzing, and remediating automated teller machine (ATM) exceptions are provided. A computing platform may configure an exception mapping table to match an exception code to a corresponding exception type. The computing platform may receive exception codes associated with one or more automated teller machines (ATMs). The computing platform may map the exception codes to corresponding exception types. The computing platform may compile exception ranking information into a ranked list. The computing platform may identify a subset of ATMs to take action on. The computing platform may identify actions to remediate issues related to the exception codes. The computing platform may automatically execute the identified actions.

16 Claims, 15 Drawing Sheets

(56) References Cited

U.S. PATENT DOCUMENTS

| | | | |
|---|---|---|---|
| 8,448,849 B1 | 5/2013 | Jenkins et al. | |
| 8,739,150 B2 | 5/2014 | Gass et al. | |
| 8,843,391 B2 | 9/2014 | Fordyce, III et al. | |
| 8,983,877 B2 | 3/2015 | Chari et al. | |
| 9,031,860 B2 | 5/2015 | Winters et al. | |
| 9,280,764 B2 | 3/2016 | Faith et al. | |
| 9,317,745 B2 | 4/2016 | Smith et al. | |
| 9,491,104 B2 | 11/2016 | Melick et al. | |
| 9,990,636 B1 | 6/2018 | Lewis et al. | |
| 10,129,777 B2 | 11/2018 | Austin et al. | |
| 10,339,554 B2 | 7/2019 | Yoder et al. | |
| 10,607,244 B2 | 3/2020 | Fordyce et al. | |
| 10,645,022 B2 | 5/2020 | Kaminski et al. | |
| 2016/0379180 A1* | 12/2016 | Smith | G06Q 20/027 705/39 |
| 2020/0074545 A1 | 3/2020 | Rose et al. | |
| 2021/0082042 A1 | 3/2021 | Bhakta et al. | |
| 2021/0398094 A1* | 12/2021 | Hunt | G07F 19/209 |

OTHER PUBLICATIONS

Petrlic, Ronald: Integrity Protection for Automated Teller Machine, 2011, International Joint Conference of IEEE TrustCom, pp. 829-834 (Year: 2011).*

Cabral et al.: A transactional model for automatic exception handling, 2011, Computer languages, Systems & Structures, pp. 43-61 (Year: 2011).*

* cited by examiner

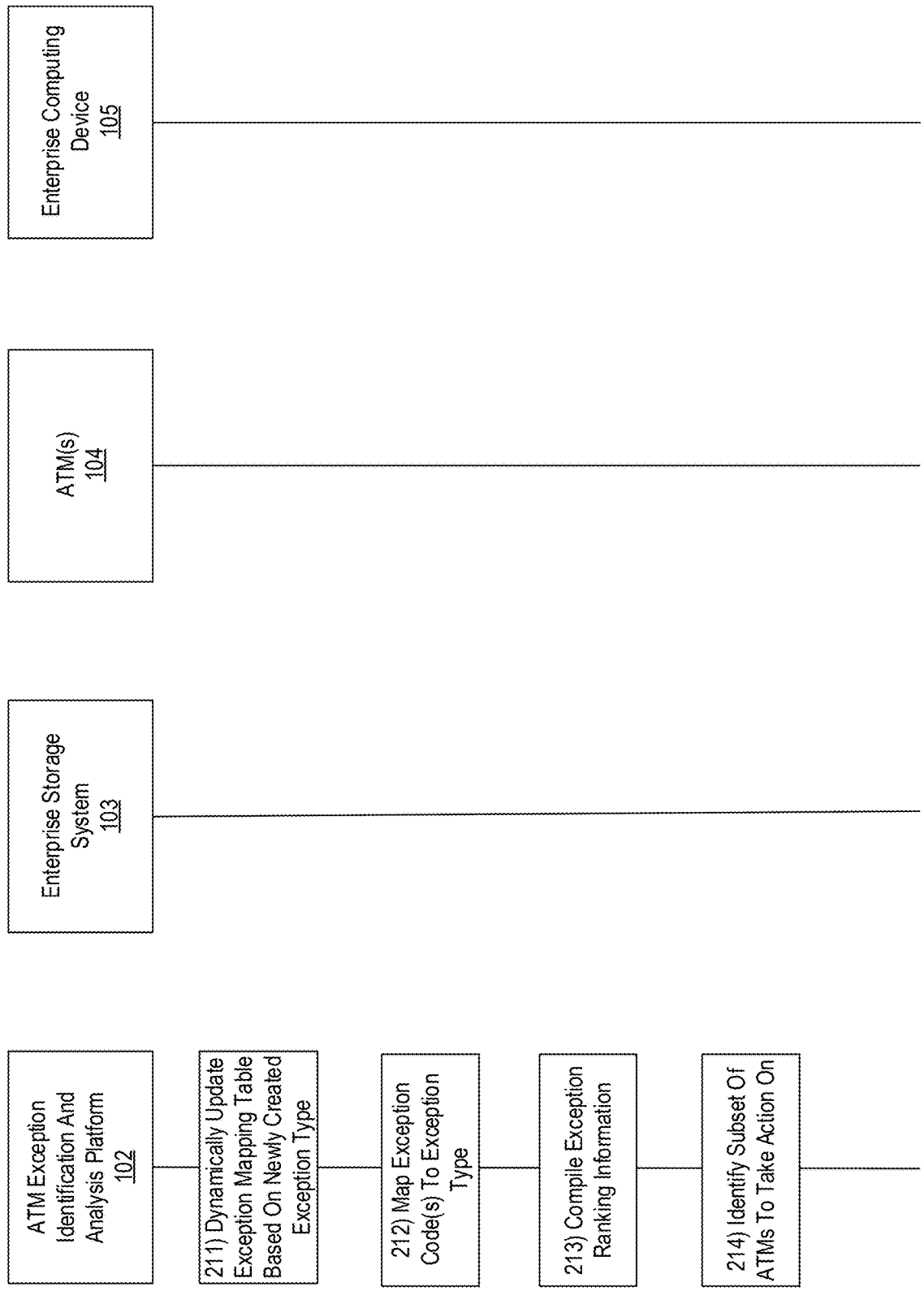

| Exception Code | Exception Type | #/month | % |
|---|---|---|---|
| 1. 'null' | No Issue | 6734 | 86.8 |
| 2. 'TLR' or 'dispense' | Issue with General Ledger/Settlement | 873 | 11.3 |
| 3. 'no read' | Issue with credit/debit card reading | 55 | 0.71 |
| 4. 'err dispense' | Issue with dispensing cash | 40 | 0.52 |
| 5. 'freeze' | Issue with ATM screen freeze | 23 | 0.30 |
| 6. 'cross load' or 'crossload' | Issue with mismatch in cash tray(s) | 12 | .15 |
| 7. 'net conn' | Issue with network connectivity | 11 | .14 |
| 8. 'pwr fail' | Issue with power outage at ATM | 9 | .12 |

FIG. 3

| ATM Model | Active ATMs | % Previous Full Week Incidents | % Change (3 to 7 Week) | % Change (prior Week to 7 Week) | Measure Previous Full Week Overall |
|---|---|---|---|---|---|
| A643 | 1413 | 95.61 | 5.07 | -4.49 | 1351 |
| B672 | 2524 | 51.39 | -4.13 | -19.29 | 1297 |
| C734 | 2376 | 48.48 | -8.79 | -15.29 | 1152 |
| D763 | 2914 | 36.96 | -6.30 | -21.07 | 1077 |
| E908 | 1415 | 64.88 | 2.77 | -8.90 | 918 |
| F232 | 722 | 113.71 | 1.28 | -4.53 | 821 |
| G092 | 633 | 106.16 | 1.99 | -11.41 | 672 |
| H729 | 494 | 62.75 | -10.94 | -22.08 | 310 |
| J162 | 286 | 88.81 | -3.24 | -4.61 | 254 |
| K237 | 363 | 69.97 | -5.78 | -13.40 | 254 |
| L682 | 84 | 278.57 | 7.83 | 4.26 | 234 |

| Measure | Measure Previous Full Week Volume | Measure Prior 7 Week Average | Measure % Change (Previous Week vs Prior 7 Weeks) | % of Total Measure Previous Full Week Overall Volume |
|---|---|---|---|---|
| EscrowCashReturned | 1731 | 1207 | 43.46 | 25.44 |
| CashHardwareError | 1535 | 1333 | 15.19 | 22.56 |
| CIMFatalEvent | 1092 | 894 | 22.09 | 16.05 |
| ForcedDeposit | 811 | 737 | 10.04 | 11.92 |
| CashAcceptFailed | 712 | 570 | 24.91 | 10.46 |
| CDMFatalEvent | 465 | 369 | 25.92 | 6.83 |
| Retracted | 324 | 269 | 20.45 | 4.76 |
| CashCaptured | 85 | 86 | -1.65 | 1.25 |
| CashRetracted | 36 | 33 | 7.69 | 0.53 |
| CashEjectFailed | 14 | 12 | 15.29 | 0.21 |
| Total | 6805 | 5511 | 23.48 | 100.00 |

FIG. 5

| ATM Servicing Vendor | Active ATMs | % Change (3 to 7 Week) | % Change (prior Week to 7 Week) | % Change (prior Week to 21 Week) | Measure Previous Full Week Overall Volume | 3 Week Average | 7 Week Average | 21 Week Average |
|---|---|---|---|---|---|---|---|---|
| Vendor 1 | 2547 | -8.95 | -9.56 | -2.58 | 1617 | 1628 | 1788 | 1660 |
| Vendor 2 | 5357 | -3.82 | 10.67 | 9.04 | 2929 | 2546 | 2647 | 2686 |
| Vendor 3 | 2811 | -0.28 | -11.79 | -6.78 | 1758 | 1987 | 1993 | 1886 |
| Vendor 4 | 4723 | -5.71 | -0.86 | -4.08 | 2571 | 2445 | 2593 | 2680 |
| Vendor 5 | 43 | -0.19 | -25.14 | -23.90 | 37 | 49 | 49 | 49 |

Exception Report

Display of FIGs. 3-7

Subset of Identified ATMs, and Executed Actions

FIG. 8

AUTOMATED TELLER MACHINE (ATM) EXCEPTION IDENTIFICATION AND ANALYSIS

BACKGROUND

Aspects of the disclosure relate to identifying and analyzing issues across a fleet of automated teller machines (ATMs) (and/or other self-service kiosks). In some instances, there may be one or more ATMs (e.g., an ATM fleet) within an enterprise system that may encounter issues (i.e., exceptions) related to the operation of one or more of the ATMs, which may be time consuming and resource intensive to resolve. Accordingly, it may be advantageous to improve the process of identifying, analyzing, and/or remediating such exceptions.

SUMMARY

Aspects of the disclosure provide effective, scalable, and convenient technical solutions that address and overcome the technical problems associated with identifying and analyzing ATM exceptions. In accordance with one or more embodiments of the disclosure, a computing platform comprising at least one processor, a communication interface, and memory storing computer-readable instructions may configure an exception mapping table to match an exception code to a corresponding exception type. The computing platform may receive one or more exception codes associated with one or more automated teller machines (ATMs). The computing platform may map the one or more exception codes to one or more corresponding exception types. The computing platform may compile exception ranking information, in which the exception ranking information may rank the one or more exception codes based on a total number of each one of the one or more exception codes. The computing platform may identify a subset of ATMs, in which the identifying may be based on a top three ranked exception codes of the one or more exception codes. The computing platform may identify one or more actions to remediate issues associated with the top three ranked exception codes. The computing platform may automatically execute the one or more actions.

In one or more examples, the computing platform may send one or more commands that may direct the subset of ATMs to automatically execute the one or more actions. In some instances, the computing platform may generate an exception report, in which the exception report may include the exception ranking information, the subset of ATMs, and the one or more actions. In one or more examples, the computing platform may send to an enterprise computing device, the exception report and one or more commands directing the enterprise computing device to display the exception report, which may cause the enterprise computing device to display the exception report.

In some instances, the computing platform may compare a total number of each exception code of the one or more exception codes to a first threshold. The computing platform may, based on the total number exceeding the first threshold, identify the one or more actions to remediate issues associated with the exception codes. The computing platform may automatically execute the one or more actions.

In one or more examples, the computing platform may compare the total number to a second threshold that may be lower than the first threshold. The computing platform may, based on the total number being equal to or below the first threshold but exceeding the second threshold, identify the one or more actions. The computing platform may not automatically execute the one or more actions.

In one or more instances, the computing platform may identify whether a particular exception code corresponds to an exception type. The computing platform may, based on determining that the particular exception code does not correspond to the exception type, create a new exception type for the particular exception code. The computing platform may dynamically update the exception mapping table based on the new exception type.

In one or more examples, the creating may be performed using a manual process at an enterprise computing device. In some instances, the creating may be performed by an automated process using a trained model. In one or more examples, the computing platform may update an engine associated with the computing platform, using a dynamic feedback loop, and based on the configuring, the mapping, the compiling, the identifying the subset of ATMs, and the identifying the one or more actions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for identifying and analyzing ATM exceptions in accordance with one or more aspects described herein;

FIGS. 3-8 depict illustrative graphical user interfaces for identifying and analyzing ATM exceptions in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to identifying and analyzing issues across a fleet of automated teller machines (ATMs) (and/or other self-service kiosks). In some instances, there may be one or more ATMs within an enterprise system that may encounter issues (i.e., exceptions) related to the operation of one or more of the ATMs. Previously, enterprise systems might not have had the ability to track ATM issues/exceptions throughout the enterprise system.

Accordingly, it may be advantageous to improve the process of identifying, analyzing, and/or remediating such exceptions. In accordance with some aspects, a centralized system may consolidate and transform ATM information across the enterprise system. Additionally or alternatively, the system may perform modeling to identify ATM hardware errors and exceptions. Additionally or alternatively, the system may include automated alerts that may be directed to vendor servicing companies to fix the ATMs, or to notify branches associated with the ATMs to adjust personnel or investigate accordingly.

Accordingly, the system may use exception mapping for all critical systems and applications, which may, for example, support thousands of ATMs across the enterprise system. Additionally or alternatively, the system may use information intelligence to create information sets that may indicate trends for hardware, software, servicing/vendor performance.

These and other features are described in further detail below.

Figure 1A:
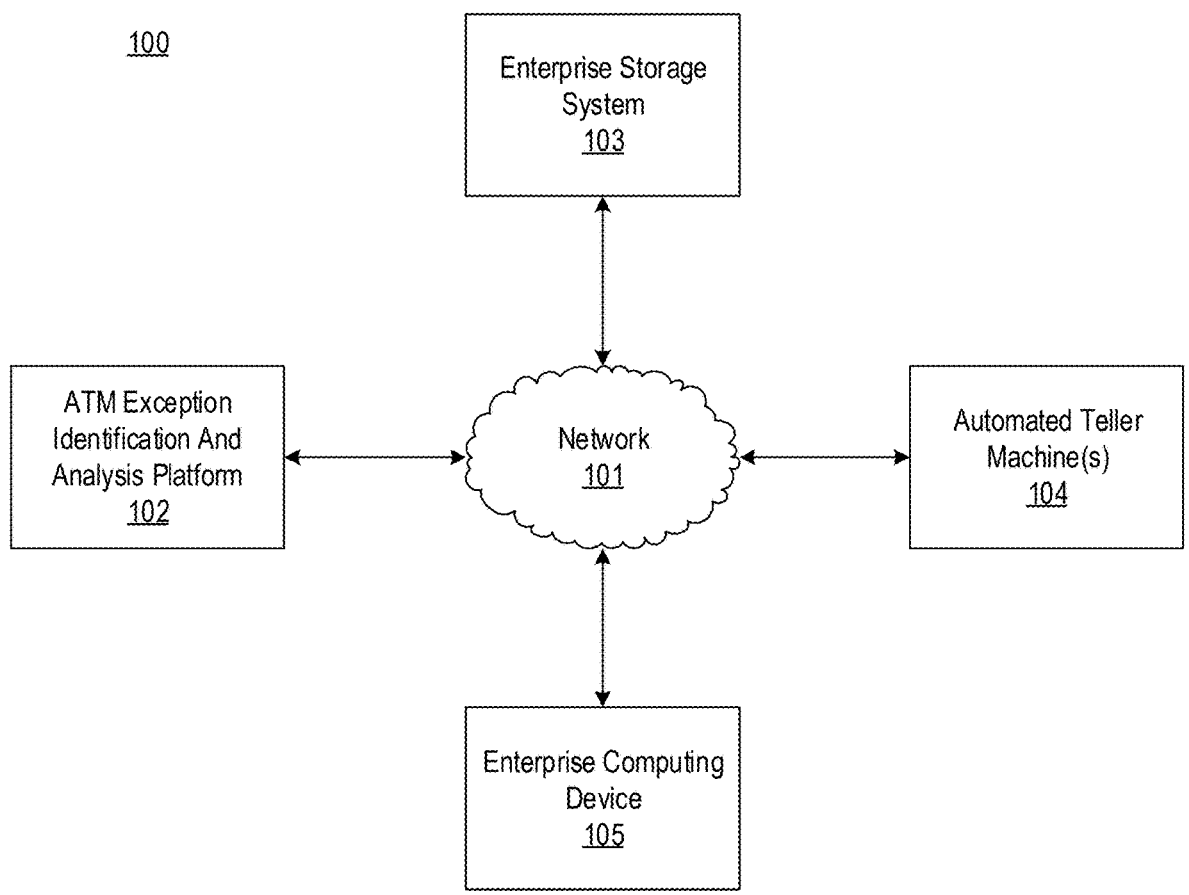
FIGS. 1A-1B depict an illustrative computing environment for identifying and analyzing ATM exceptions in accordance with one or more aspects described herein.
Figure 1B:
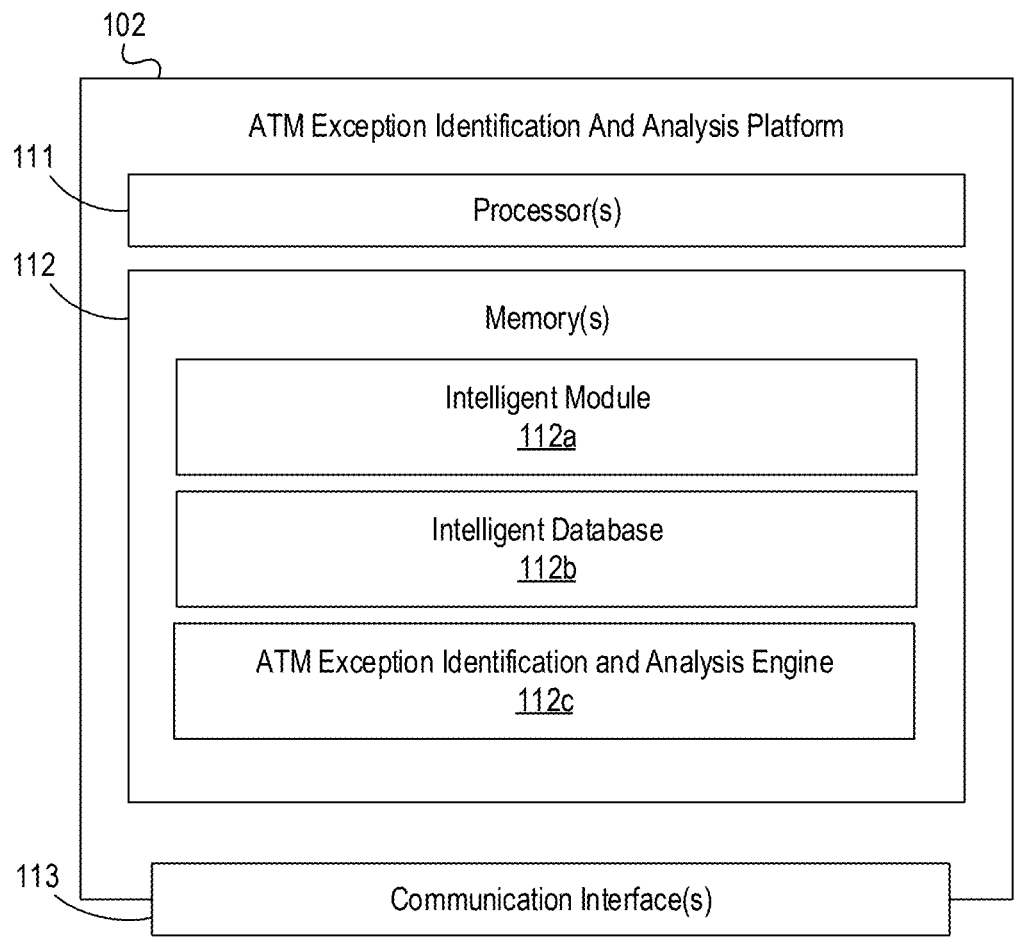

FIGS. 1A-1B depict an illustrative computing environment for identifying and analyzing ATM exceptions in accordance with one or more aspects described herein. Referring to FIG. 1A, computing environment 100 may include one or more computer systems. For example, computing environment 100 may include ATM exception identification and analysis platform 102, enterprise storage system 103, automated teller machine(s) (ATMs) 104, and/or enterprise computing device 105.

As described further below, ATM exception identification and analysis platform 102 may be a computer system that includes one or more computing devices (e.g., servers, server blades, or the like) and/or other computer components (e.g., processors, memories, communication interfaces) that may be used to identify and/or analyze exceptions related to the operation of ATMs 104, identify one or more actions to remediate the identified exceptions, and/or perform other functions.

Enterprise storage system 103 may be or include one or more computing devices (e.g., servers, server blades, or the like) and/or computer components (e.g., processors, memories, communication interfaces, and/or other components). In some instances, enterprise storage system 103 may include one or more data sources that may receive information from ATMs 104 (e.g., exception codes related to the operation of ATMs 104), as discussed in more detail below. In some instances, enterprise storage system 103 may be configured as a cloud storage system, in which enterprise storage system 103 may be a cloud computing model that stores data on the Internet through a cloud computing provider who manages and operates enterprise storage system 103 as a service. In some instances, enterprise storage system 103 may be local or non-cloud based storage, or may support cloud based storage.

ATMs 104 may be computing devices or systems configured to dispense funds, display account information, and/or otherwise facilitate transactions for a customer such as processing a recently deposited financial instrument. ATMs 104 may also generate and/or send exception codes related to the operation of ATMs to enterprise system 103 and/or ATM exception identification and analysis platform 102. Although ATMs 104 are shown as a single system, this is for illustrative purposes only, and any number of ATMs may be included in the environment 100 without departing from the scope of the disclosure. In some instances, one or more of ATMs 104 may be distributed throughout different geographical regions, locations, etc.

Enterprise computing device 105 may be and/or otherwise include a laptop computer, desktop computer, mobile device, tablet, smartphone, server, server blade, and/or other device that may be configured to receive and/or display an exception report (e.g., a report summarizing the analysis and remediation of previously identified exceptions) using one or more user graphical interfaces (e.g., graphical user interfaces similar to those illustrated in FIGS. 3-8), on behalf of an enterprise organization, such as a financial institution. In some instances, enterprise computing device 105 may be a user device (i.e., a mobile phone) associated with a client of the financial institution.

Computing environment 100 may also include one or more networks, which may interconnect ATM exception identification and analysis platform 102, enterprise storage system 103, ATMs 104, and/or enterprise computing device 105. For example, computing environment 100 may include a network 101 (which may interconnect, e.g., ATM exception identification and analysis platform 102, enterprise storage system 103, ATMs 104, and/or enterprise computing device 105).

In one or more arrangements, ATM exception identification and analysis platform 102, enterprise storage system 103, ATMs 104, and/or enterprise computing device 105 may be any type of computing device capable of sending and/or receiving requests and processing the requests accordingly. For example, ATM exception identification and analysis platform 102, enterprise storage system 103, ATMs 104, enterprise computing device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all ATM exception identification and analysis platform 102, enterprise storage system 103, ATMs 104, and/or enterprise computing device 105 may, in some instances, be special-purpose computing devices configured to perform specific functions.

Referring to FIG. 1B, ATM exception identification and analysis platform 102 may include one or more processors (e.g., processor 111), memory 112, and a communication interface (e.g., communication interface 113)). A data bus may interconnect the processor 111, memory 112, and communication interface 113. Communication interface 113 may be a network interface configured to support communication between ATM exception identification and analysis platform 102 and one or more networks (e.g., network 101, or the like). Communication interface 113 may be communicatively coupled to the processor(s) 111. The memory may include one or more program modules having instructions that when executed by processor(s) 111 cause ATM exception identification and analysis platform 102 to perform one or more functions described herein and/or one or more databases that may store and/or otherwise maintain information which may be used by such program modules and/or processor(s) 111. In some instances, the one or more program modules and/or databases may be stored by and/or maintained in different memory units of ATM exception identification and analysis platform 102 and/or by different computing devices that may form and/or otherwise make up ATM exception identification and analysis platform 102. For example, the memory may have, host, store, and/or include intelligent module 112a, intelligent database 112b, and/or ATM exception identification and analysis engine 112c.

Intelligent module 112a may have instructions that direct and/or cause ATM exception identification and analysis platform 102 to receive and/or analyze one or more exception codes from enterprise storage system 103, as discussed in more detail below. Intelligent database 112*b* may have instructions and/or data used by intelligent module 112*a*, and/or ATM exception identification and analysis platform 102 to store information used by intelligent module 112*a* and/or ATM exception identification and analysis platform 102 to identify and analyze exceptions related to the operation of ATMs 104, and/or perform other functions. ATM exception identification and analysis engine 112*c* may be used to support the identification, analysis, and/or remediation of ATM exceptions, and/or perform other functions. In some instances, ATM exception identification and analysis engine 112*c* may host, train, and/or otherwise configure a model to perform one or more of the functions described herein.

Figure 2A:
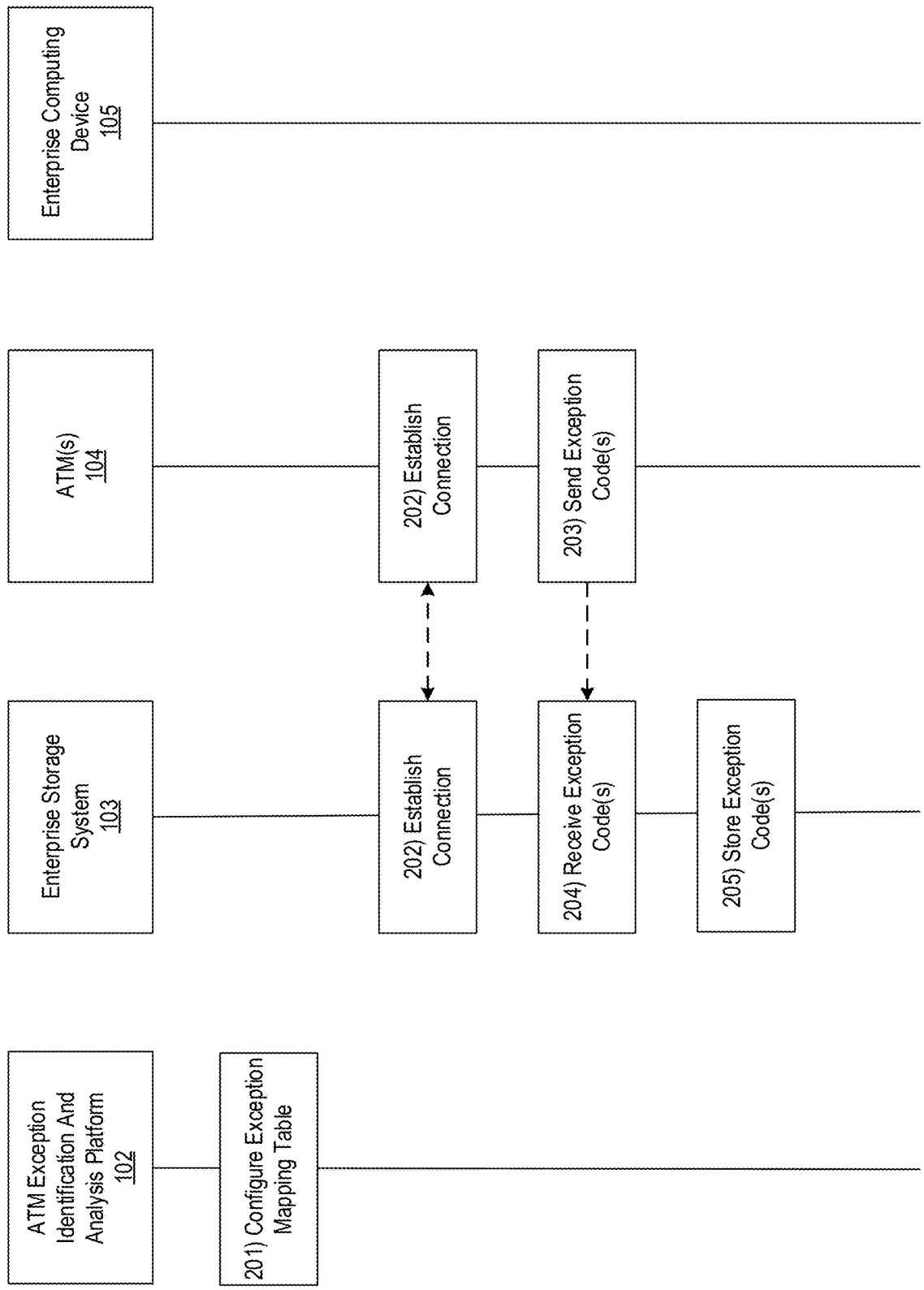

FIGS. 2A-2E depict an illustrative event sequence for identifying and analyzing ATM exceptions in accordance with one or more aspects described herein. Referring to FIG. 2A, at step 201, ATM exception identification and analysis platform 102 may configure an exception mapping table. An exception mapping table may refer to a file, spreadsheet, or any other type of information-containing medium that may store (e.g., stored at intelligent database 112*b*) one or more exception codes related to the operation of ATMs 104. Additionally, ATM exception identification and analysis platform 102 may use the exception mapping table to map any received exception code to an exception type. An exception type may refer to an explanation of the issue related to the exception code, which ATM exception identification and analysis platform 102 may use to support the identification, analysis, and/or remediation of the issue associated with the exception code.

In some instances, an exception code may be mapped to a corresponding exception type using a manual process, in which a device (e.g., enterprise computing device 105) that is associated with the enterprise system may analyze exception codes and create corresponding exception types. Additionally or alternatively, an exception code may be mapped to a corresponding exception type using an automated process, in which, for example, ATM exception identification and analysis engine 112*c* may host and/or train a model (e.g., a machine learning model) to analyze historical exception codes that were previously mapped to an exception type, receive a new exception code, and use the trained model to categorize the new exception code as corresponding to an existing exception type. In some instances, the model may be trained to create a new exception type based on receiving a new exception code that might not correspond to any existing exception type. In some instances, a device (e.g., enterprise computing device 105) associated with the enterprise system, may support and/or review the model when new exception types are created.

For example, and discussed in more detail below, FIG. 3 may show a visual example of what an exception mapping table may look like. In some instances, an exception mapping table may be referred to as an exception dashboard, which may be displayed by enterprise computing device 105, in furtherance of performing the functions described below. In some instances, the exception mapping table may be configured based on ATM deposit information (e.g., cash deposited into one or more of ATMs 104). Additionally or alternatively, the exception mapping table may be configured based on ATM dispense information (e.g., cash dispensed into one or more of ATMs 104). Additionally or alternatively, the exception mapping table may be configured based on general ledger information (e.g., a comprehensive record of financial information associated with ATMs 104 and maintained by the enterprise system). In some instances, the general ledger information may be stored at enterprise storage system 103.

At step 202, ATM(s) 104 may establish a connection with enterprise storage system 103. For example, ATM(s) 104 may establish a first wireless data connection with enterprise storage system 103 to link ATM(s) 104 to enterprise storage system 103 (e.g., in preparation for sending one or more exception codes). In some instances, ATM(s) 104 may identify whether or not a connection is already established with enterprise storage system 103. If a connection is already established with enterprise storage system 103, ATM(s) 104 might not re-establish the connection. If a connection is not already established with enterprise storage system 103, ATM(s) 104 may establish the first wireless data connection as described herein.

At step 203, ATM(s) 104 may send one or more exception codes to enterprise storage system 103. For example, ATM(s) 104 may send the exception code(s) to enterprise system 103 while the first wireless data connection is established.

At step 204, enterprise storage system 103 may receive the exception code(s). For example, enterprise storage system 103 may receive the exception code(s) while the first wireless data connection is established. In some instances, the exception code(s) may also contain information that identifies which ATM of ATMs 104 generated the exception code, the date and time of the exception, geographic information, vendor servicing information, software version information, hardware information, and/or other similar information that may be used by ATM exception identification and analysis platform 102 in furtherance of performing the functions described herein.

At step 205, enterprise storage system 103 may store the exception code(s). In some instances, in storing the exception code(s), enterprise storage system 103 may create a file that may be populated with the exception code(s) and related information. In some instances, the storing may occur anytime enterprise storage system 103 receives one or more exception codes from ATMs 104 (e.g., in real-time). In some instances, the storing may occur on a periodic basis (e.g., once every 24 hours). In some instances, the file may be dynamically updated based on enterprise storage system 103 receiving new exception codes and related information.

Figure 2B:
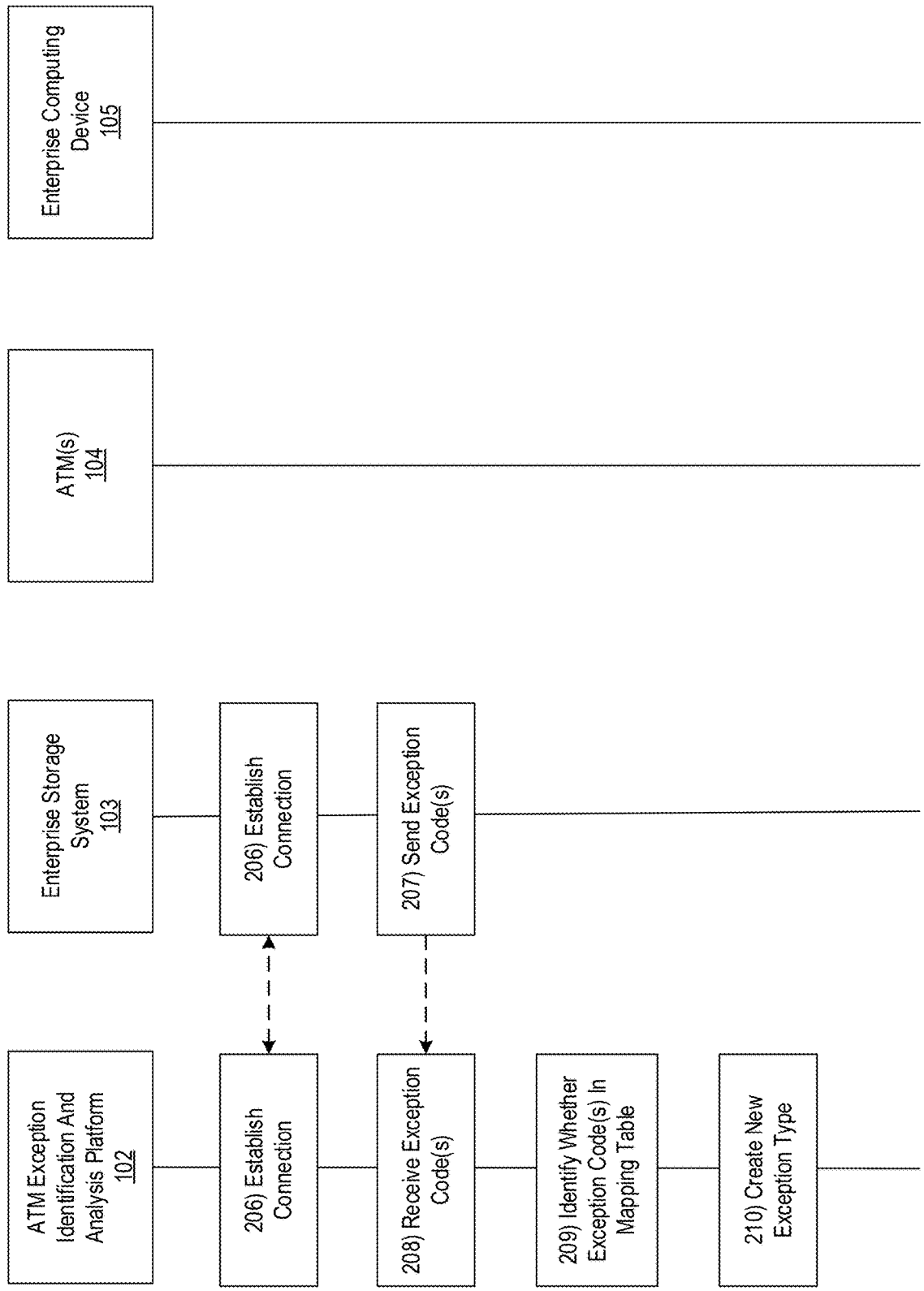

Referring to FIG. 2B, at step 206, enterprise storage system 103 may establish a connection with ATM exception identification and analysis platform 102. For example, enterprise storage system 103 may establish a second wireless data connection with ATM exception identification and analysis platform 102 to link enterprise storage system 103 to ATM exception identification and analysis platform 102 (e.g., in preparation for sending the exception codes). In some instances, enterprise storage system 103 may identify whether or not a connection is already established with ATM exception identification and analysis platform 102. If a connection is already established with ATM exception identification and analysis platform 102, enterprise storage system 103 might not re-establish the connection. If a connection is not already established with ATM exception identification and analysis platform 102, enterprise storage system 103 may establish the second wireless data connection as described herein.

At step 207, enterprise storage system 103 may send the exception code(s) to ATM exception identification and analysis platform 102. For example, enterprise storage system 103 may send the exception code(s) via the communication interface 113 and while the second wireless data connection is established. At step 208, ATM exception identification and analysis platform 102 may receive the exception code(s). For example, ATM exception identification and analysis platform 102 may receive the exception code(s) via the communication interface 113 and while the second wireless data connection is established.

In some instances, in receiving the exception codes, ATM exception identification and analysis platform 102 may receive a file that contains all the exception codes and related information that was previously created by enterprise storage system 103 at step 205. In some instances, ATM exception identification and analysis platform 102 may create the exception code file instead of enterprise storage system 103. In some instances, ATM exception identification and analysis platform 102 may receive the exception codes from enterprise storage system 103 on a real-time basis. In some instances, ATM exception identification and analysis platform 102 may receive the exception codes from enterprise storage system 103 on a periodic basis (e.g., once every 24 hours).

At step 209, ATM exception identification and analysis platform 102 may identify whether the exception codes correspond to an existing exception code in the exception mapping table (e.g., the exception mapping table that was configured in step 201). For example, and with reference to FIG. 3, ATM exception identification and analysis platform 102 may query the exception mapping table to find a match between a received exception code and a corresponding exception code/exception type. For example, if ATM exception identification and analysis platform 102 receives an 'err dispense' exception code, ATM exception identification and analysis platform 102 may query the exception mapping table, and match the 'err dispense' exception code to the corresponding 'err dispense' exception code in the exception mapping table, which may then be associated with the corresponding exception type (e.g., issue with dispensing cash), as discussed in more detail with respect to step 212. In this manner, ATM exception identification and analysis platform 102 may use the exception mapping table to match the received exception codes to a proper exception code and its corresponding exception type.

In some instances, if all of the exception codes that were received at step 208 are matched, then ATM exception identification and analysis platform 102 may proceed to step 212 and map the exception codes to their corresponding exception type. If any of the received exception codes are not matched, then ATM exception identification and analysis platform 102 may proceed to step 210.

At step 210, in response to not finding a match for an exception code that was received in step 208, ATM exception identification and analysis platform 102 may create a new exception type that corresponds to the exception code. In some instances, a new exception type may be created using techniques similar to those described above in the configuring step 201. For example, a new exception type may be created using a manual process, in which a device (e.g., enterprise computing device 105) associated with the enterprise system may analyze the exception code and create a new exception type. In some instances, a new exception type may be created using an automated process, in which, for example, ATM exception identification and analysis engine 112c may use a model (e.g., a machine learning model) to analyze historical exception codes that were previously mapped to a corresponding exception type, receive a new exception code, and use the model to categorize a new exception code as correspond to an existing exception type. In some instances, the model may be trained to create a new exception type based on the new exception code that might not correspond to any existing exception type.

Referring to FIG. 2C, at step 211, ATM exception identification and analysis platform 102 may dynamically update the exception mapping table based on the newly created exception type. For example, ATM exception identification and analysis platform 102 may add the new exception code and the new exception type to the exception mapping table based on the actions performed in step 210. In this manner, ATM exception identification and analysis platform 102 may continually and dynamically update the exception mapping table to ensure the exception mapping table may always map exception codes to a proper exception type, even when new and/or unknown exception codes are received.

At step 212, ATM exception identification and analysis platform 102 may map the exception codes to their corresponding exception types using the exception mapping table. For example, and with reference to FIG. 3, upon receiving a 'null' exception code, ATM exception identification and analysis platform 102 may map the 'null' exception code to its corresponding exception type (e.g., no issue). This exception may indicate that the corresponding ATM is not experience an issue (i.e., is properly functioning), which may be used as a baseline reference in determining what issues may or may not be present at any of ATMs 104. In some instances, the 'null' exception code may be output by any of ATMs 104 periodically (e.g., once every 24 hours), when the ATMs 104 are functioning properly.

As another example, upon receiving a 'no read' exception code, ATM exception identification and analysis platform 102 may map that code to its corresponding exception type (e.g., issue with a credit/debit card reading). This exception may refer to an issue of an ATM having trouble reading a credit/debit card at the ATM. In this manner, ATM exception identification and analysis platform 102 may use the exception mapping table to map each exception code to its corresponding exception type, which may then be used to compile exception ranking information, as discussed in more detail at step 213.

At step 213, ATM exception identification and analysis platform 102 may compile exception ranking information based on the mapping that was performed at step 212. For example, the exception ranking information may be compiled into a list that may be similar to what is shown in FIG. 3 (by, e.g., updating the exception mapping table based on the exception ranking information). As shown in FIG. 3, each exception code may be ranked based on the total number of exception codes per unit of time (e.g., per month) and/or the percentage of the exception code compared to the total number of all the other exception codes.

In some instances, the exception ranking information may be configured based on ATM deposit information (e.g., cash deposited into one or more of ATMs 104). In some instances, the exception ranking information may be configured based on ATM dispense information (e.g., cash dispensed into one or more of ATMs 104). In some instances, the exception ranking information may be configured based on general ledger information (e.g., a comprehensive record of financial information associated with ATMs 104 and maintained by the enterprise system). In this manner, the exception ranking information may be compiled using a variety of different information sources/categories. In some instances, display 305 may be referred to as a dashboard, which may be sent to and displayed by enterprise computing device 105.

Figure 7:
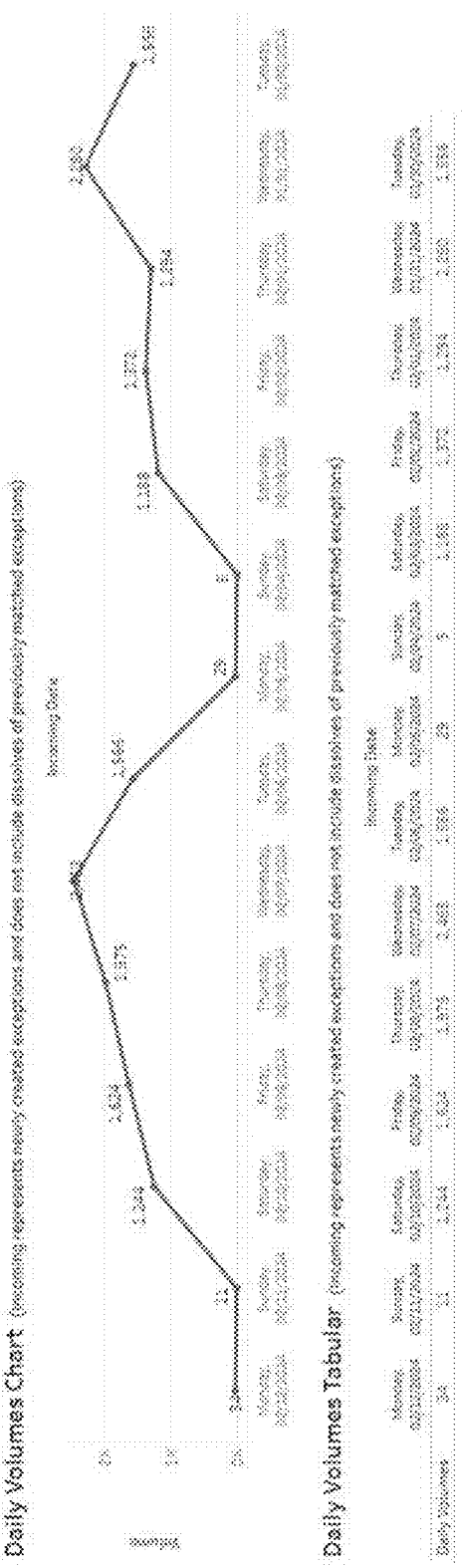

In some instances, the compiled exception ranking information may be categorized based on one or more ATM models of ATMs 104, such as what is shown by FIG. 4. As shown by FIG. 4, display 405 may show a list of ATM models, active ATMs, and various information relating to exceptions that occurred at the ATMs, which may be used in furtherance of analyzing the compiled exception ranking information. Additionally or alternatively, the compiled exception ranking information may be categorized based on a single ATM of ATMs 104, such as what is shown by FIG. 5. As shown by FIG. 5, display 505 may show hardware-specific exceptions for one particular ATM of ATMs 104, which may be used in furtherance of analyzing the compiled exception ranking information. Additionally or alternatively, the compiled exception ranking information may be categorized based on one or more ATM servicing vendors, such as what is shown by FIG. 6. As shown by FIG. 6, display 605 may show one or more ATM servicing vendors, an active ATMs column, and various exception information, which may be used in furtherance of analyzing the compiled exception ranking information. In some instances, the compiled exception ranking information may be categorized via a graphical chart that tabulates a daily volume of exceptions across ATMs 104, such as what is shown by FIG. 7. Referring to FIG. 7, display 705 may show a graph of a total number of exceptions for each day/a day-to-day volume of exceptions, which ATM exception identification and analysis platform 102 may use in furtherance of identifying and/or analyzing trends related to ATM exceptions. In this manner, information related to the identification and analysis of exceptions related to the operation of ATMs 104 may be categorized in a variety of formats, in order to further assist ATM exception identification and analysis platform 102 in the identification, analysis, and/or remediation of ATM exceptions.

At step 214, ATM exception identification and analysis platform 102 may identify a subset of ATMs to take action on using the exception ranking information that was compiled by ATM exception identification and analysis platform 102 in step 213. In some instances, ATM exception identification and analysis platform 102 may identify the subset of ATMs based on a ranking system. A first example ranking system may be based on what is shown by FIG. 3, in which, for example, the three highest ranked exception codes are identified, and any ATM of ATMs 104 that outputted either of the top three exception codes are identified as the subset of ATMs to take action on. However, the ranking system can be based on more or fewer than the top three highest ranked exception codes without departing from the scope of the disclosure.

Additionally or alternatively, a second example ranking system may be based on what is shown by FIG. 4, in which the three highest ranked ATM models (ranked based on, e.g., the "measure previous full week overall" column) are identified by ATM exception identification and analysis platform 102 as the subset of ATMs to take action on. However, other columns in FIG. 4 may be used as the basis of the second example ranking system without departing from the scope of the disclosure. Additionally or alternatively, a third example ranking system may be based on what is shown by FIG. 6, in which the three highest ranked ATM servicing vendors (ranked based on, e.g., the "measure previous full week overall volume" column) are identified by ATM exception identification and analysis platform 102 as the subset of ATMs to take action on. However, other columns in FIG. 6 may be used as the basis of the third example ranking system without departing from the scope of the disclosure.

In some instances, ATM exception identification and analysis platform 102 may identify the subset of ATMs based a threshold system. An example threshold system may be based on what is shown by FIG. 3, in which the total number of exception codes for a particular exception code are compared to a first threshold and a second threshold. If the total number of exception codes is greater than the first threshold, then any ATM of ATMs 104 that outputted that exception code are identified as the subset of ATMs to take action on. Further, any action that is identified as remediating the exceptions may be executed automatically, as discussed in detail with respect to step 216. If an exception code is less than or equal to the first threshold, but greater than a second threshold that is less than the first threshold, then any ATM of ATMs 104 that outputted the exception code may also be identified as the subset of ATMs to take action on. However, any action that is identified as remediating the exceptions might not be executed automatically. Rather, a device associated with the enterprise system (e.g., enterprise computing device 105) may be notified of the potential action and decide whether or not to execute the action.

Figure 2D:
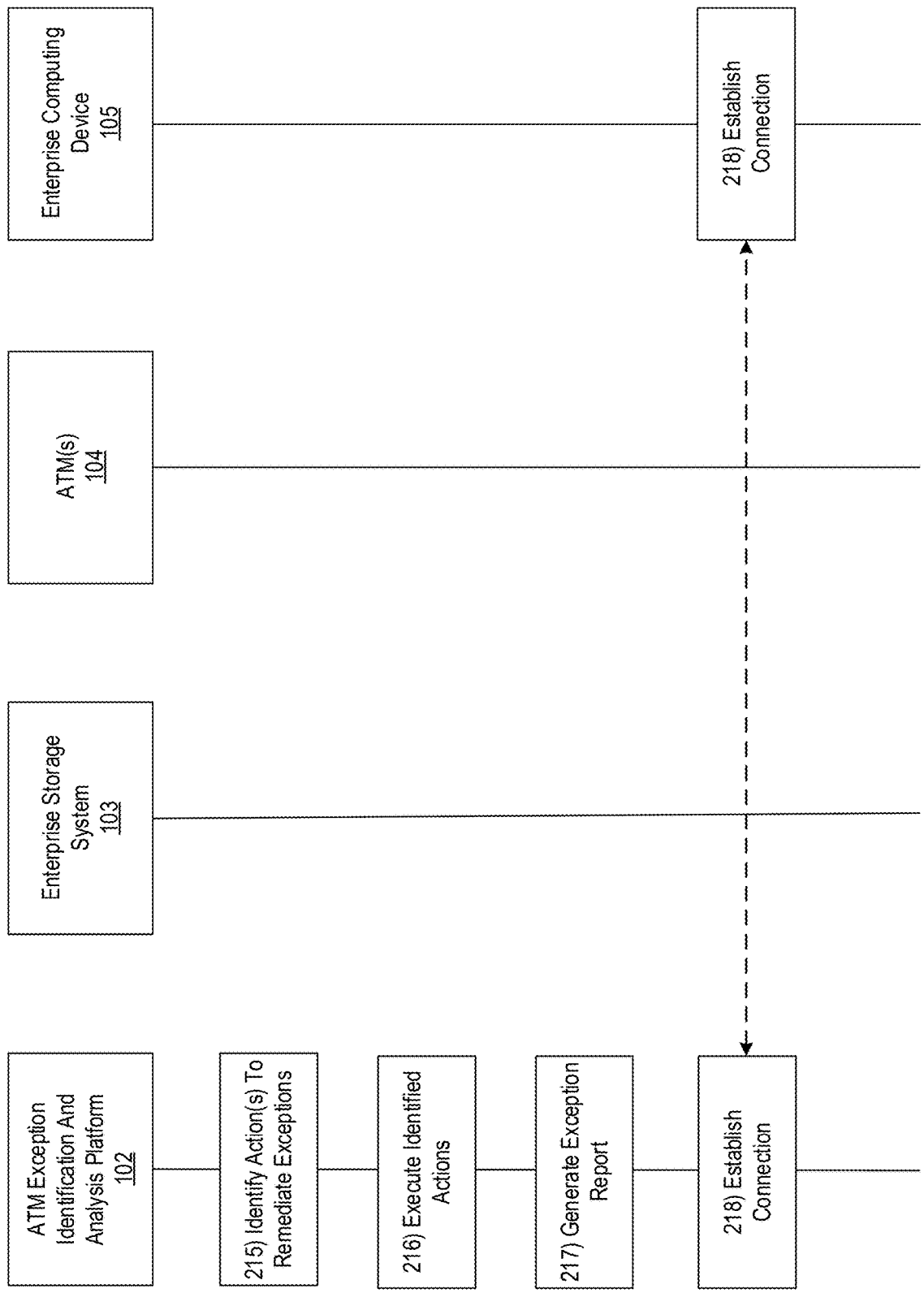

Referring to FIG. 2D, at step 215, ATM exception identification and analysis platform 102 may identify one or more actions to remediate the exceptions outputted by the subset of ATMs that were identified in step 214. Actions to remediate exceptions may be identified in a variety of different ways. For example, an action may be identified as remediating an exception if the exception has previously been remediated on a different subset of ATMs that previously outputted the same exception, which was subsequently successfully remediated using the action. The action may be, for example, a software update. For example, if the exception code is 'freeze', which corresponds to an issue with an ATM's screen freezing, and other ATMs were previously fixed with a new software update, then other ATMs that output the same exception code may receive the same software update. For ATMs that are above a certain ranking (e.g., in the top three highest ranked exception codes) and/or threshold (e.g., above the first threshold), this action may be executed automatically by sending commands, that when receive by the subset of ATMs, direct the ATMs to automatically apply the software update.

In some instances, if ATM exception identification and analysis platform 102 does not find a previously executed action that could remediate the issue at the subset of ATMs, then, based on the exception type, ATM exception identification and analysis platform 102 may identify a team associated with the exception type to further review and analyze the issue. For example, if the exception code is 'no read', which corresponds to an issue of a credit or debit card being read, and there is no software update that is known by ATM exception identification and analysis platform 102 as remediating that issue, then ATM exception identification and analysis platform 102 may identify the action as determining the proper team associated with the enterprise system (e.g., a software debugging team) and automatically sending a notification to that team for further analysis and review.

As another example, if an exception relates to a hardware issue, such as one of the hardware exception codes shown in FIG. 5, then ATM exception identification and analysis platform 102 may identify an action as alerting an ATM servicing vendor associated with one or more of the subset of ATMs to further investigate the hardware issue. There are many actions that ATM exception identification and analysis platform 102 may identify to remediate issues related to the operation of ATMs 104 without departing from the scope of the disclosure, such as alerting a branch associated with the subset of ATMs, shutting down one or more ATMs to be serviced, and/or other similar remedial actions.

At step 216, ATM exception identification and analysis platform 102 may execute the one or more identified actions. In some instances, the actions that correspond to exception codes that were the highest ranked (e.g., the top three highest ranked exception codes of the first ranking system) may be executed automatically. In some instances, the actions that correspond to exception codes that were above the first threshold (e.g., using the example threshold system) may be automatically executed. In some instances, the actions that correspond to exception codes that were equal to or below the first threshold, but above the second threshold may be recorded and sent in a notification to a device associated with the enterprise system (e.g., enterprise computing device 105) for further review and analysis.

At step 217, ATM exception identification and analysis platform 102 may generate an exception report. For example, the exception report may summarize any of the information shown in FIGS. 3-7. The exception report may additionally show the subset of ATMs that were identified in step 214, the actions that were identified in step 215, and (if applicable), an indication that the actions were executed.

At step 218, ATM exception identification and analysis platform 102 may establish a connection with enterprise computing device 105. For example, ATM exception identification and analysis platform 102 may establish a third wireless data connection with enterprise storage system 103 to link ATM exception identification and analysis platform 102 to enterprise storage system 103 (e.g., in preparation for sending the exception report) In some instances, ATM exception identification and analysis platform 102 may identify whether or not a connection is already established with enterprise storage system 103. If a connection is already established with enterprise storage system 103, ATM exception identification and analysis platform 102 might not re-establish the connection. If a connection is not already established with enterprise storage system 103, ATM exception identification and analysis platform 102 may establish the third wireless data connection as described herein.

Figure 2E:
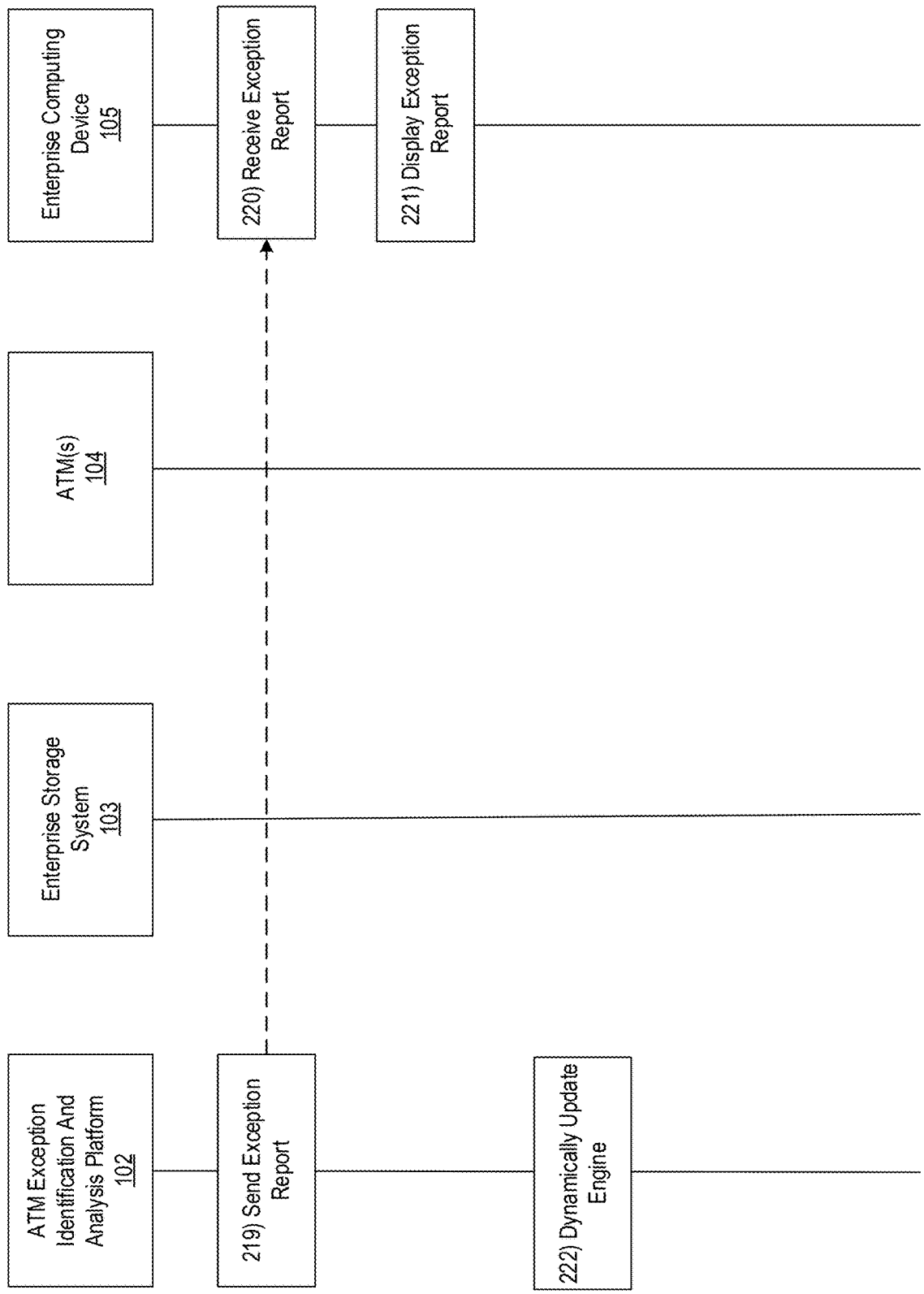

Referring to FIG. 2E, at step 219, ATM exception identification and analysis platform 102 may send the exception report to enterprise computing device 105. For example, ATM exception identification and analysis platform 102 may send the exception report via the communication interface 113 and while the third wireless data connection is established. In some instances, ATM exception identification and analysis platform 102 may also send commands directing enterprise computing device 105 to display the exception report.

At step 220, enterprise computing device 105 may receive the report and the commands directing enterprise computing device 105 to display the exception report. For example, enterprise computing device may receive the exception report and the commands via the communication interface 113 and while the third wireless data connection is established. At step 221, based on or in response to the commands, enterprise computing device 105 may display the exception report (e.g., displaying what is shown by FIG. 8). For example, FIG. 8 may show a display (e.g., display 805), which may show any of the information shown by FIGS. 3-7, the subset of ATMs that were identified in step 214, and the actions that were identified in step 215 and/or executed in step 216.

At step 222, ATM exception identification and analysis platform may dynamically update the engine (e.g., ATM exception identification and analysis engine 112c). For example, ATM exception identification and analysis platform 102 may dynamically update the engine (by creating, e.g., a dynamic feedback loop) based on the outputs of step 201, and steps 209-217, and/or feedback from enterprise storage system 103, ATMs 104, and/or enterprise computing device 105. In doing so, ATM exception identification and analysis platform 102 may dynamically and continuously update and/or otherwise refine the engine so as to increase accuracy of the engine over time. In increasing the accuracy of the engine, the engine may increase the effectiveness of remediating the issues using the actions corresponding to the issues.

FIG. 3 depicts an illustrative graphical user interface for implementing one or more aspects described herein. Referring to FIG. 3, display 305 may show an example exception mapping table that may be compiled into an exception information ranking list. For example, display 305 may show one or more exception codes, one or more corresponding exception types, a total number of exceptions per unit of time, and/or a total percentage of an exception type. In some instances, the one or more exception codes may be ranked based on the total number of exceptions per unit of time and/or total percentage of the exceptions.

An example exception code may be a 'null' code, which ATM exception identification and analysis platform 102 may map to a "no issue" exception type. Another example exception code may be a 'TLR' or 'Dispense' code, which ATM exception identification and analysis platform 102 may map to an "issue with general ledger/settlement" exception type. Another example exception code may be a 'no read' code, which ATM exception identification and analysis platform 102 may map to an "issue with credit/debit card reading" exception type. Another example exception code may be an 'err dispense' code, which ATM exception identification and analysis platform 102 may map to an "issue with dispending case" exception type. Another example exception code may be a 'freeze' code, which ATM exception identification and analysis platform 102 may map to an "issue with ATM screen freeze" exception type. Another example exception code may be a 'cross load' or 'crossload' code, which ATM exception identification and analysis platform 102 may map to an "issue with mismatch in cash tray(s)" exception type. Another example exception code may be a 'net conn' code, which ATM exception identification and analysis platform 102 may map to an "issue with network connectivity" exception type. Another example exception code may be a 'pwr fail' exception type, which ATM exception identification and analysis platform 102 may map to an "issue with power outage at ATM" exception type. Although eight exception codes are shown, more or fewer may be used without departing from the scope of the disclosure.

FIG. 4 depicts an illustrative graphical user interface for implementing one or more aspects described herein. Referring to FIG. 4, display 405 may show a list of ATM models, active ATMs, and various information relating to exceptions that occurred at the ATMs. In some instances, the rate of change of exceptions during a period of time may be shown for each of the ATM models. In some instances, the total number of exceptions for a previous week may be shown. For example, display 405 may show a "percent previous full week incidents" column. Additionally or alternatively, display 405 may show a "percent change (3 to 7 week)" column. Additionally or alternatively, display 405 may show a "percent change (prior week to 7 week)" column. Additionally or alternatively, display 405 may show a "measure previous full week overall" column.

FIG. 5 depicts an illustrative graphical user interface for implementing one or more aspects described herein. Referring to FIG. 5, display 505 may show hardware-specific exceptions for one particular ATM of ATMs 104. For example, display 505 may show a "measure previous full week volume" column. Additionally or alternatively, display 505 may show a "measure prior 7 week average" column. Additionally or alternatively, display 505 may show a "measure percent change (previous week vs prior 7 weeks)" column. Additionally or alternatively, display 505 may show a "percent of total measure previous full week overall volume" column.

FIG. 6 depicts an illustrative graphical user interface for implementing one or more aspects described herein. Referring to FIG. 6, display 605 may show one or more ATM servicing vendors, an active ATMs column, and various exception information. For example, display 605 may show a "percent change (3 week to 7 week)" column. Additionally or alternatively, display 605 may show a "percent change (prior week to 7 week)" column. Additionally or alternatively, display 605 may show a "percent change (prior week to 21 week)" column. Additionally or alternatively, display 605 may show a "measure previous full week overall volume" column. Additionally or alternatively, display 605 may show a "3 week average" column. Additionally or alternatively, display 605 may show a "7 week average" column. Additionally or alternatively, display 605 may show a "21 week average" column.

FIG. 7 depicts an illustrative graphical user interface for implementing one or more aspects described herein. Referring to FIG. 7, display 705 may show a graph of a total number of exceptions for each day/a day-to-day volume of exceptions, which ATM exception identification and analysis platform 102 may use in furtherance of identifying and/or analyzing trends related to ATM exceptions. FIG. 8 may show a display (e.g., display 805), which may show any of the information shown by FIGS. 3-7, the subset of ATMs that were identified in step 214, and the actions that were identified in step 215 and/or executed in step 216.

Figure 9A:
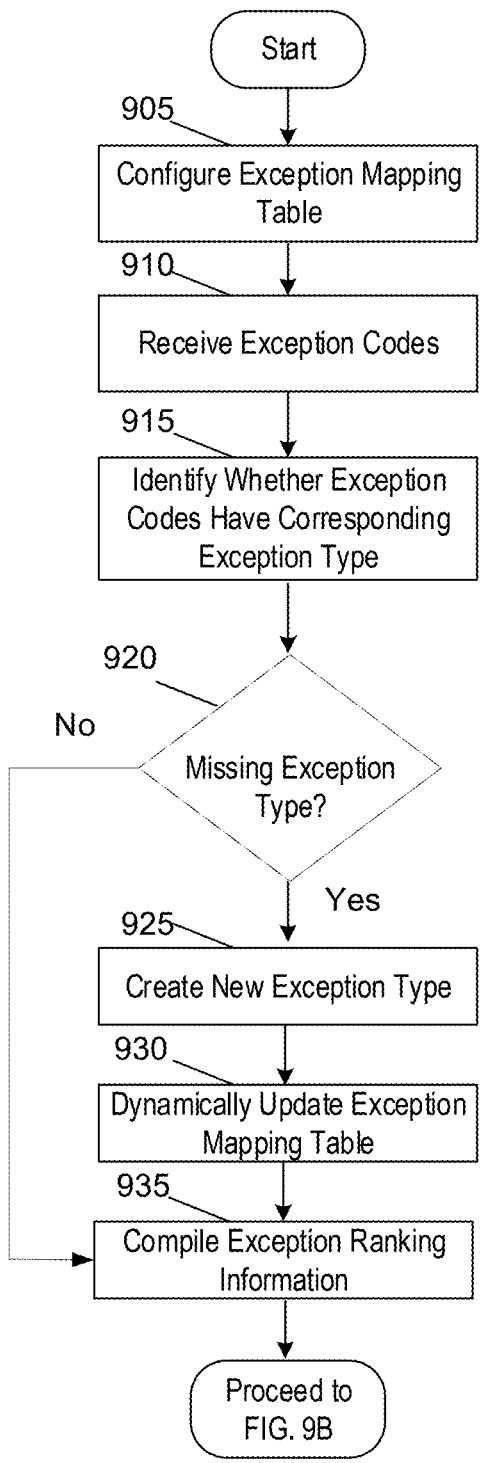
FIGS. 9A-9B depict an illustrative method for identifying and analyzing ATM exceptions with one or more aspects described herein.
Figure 9B:
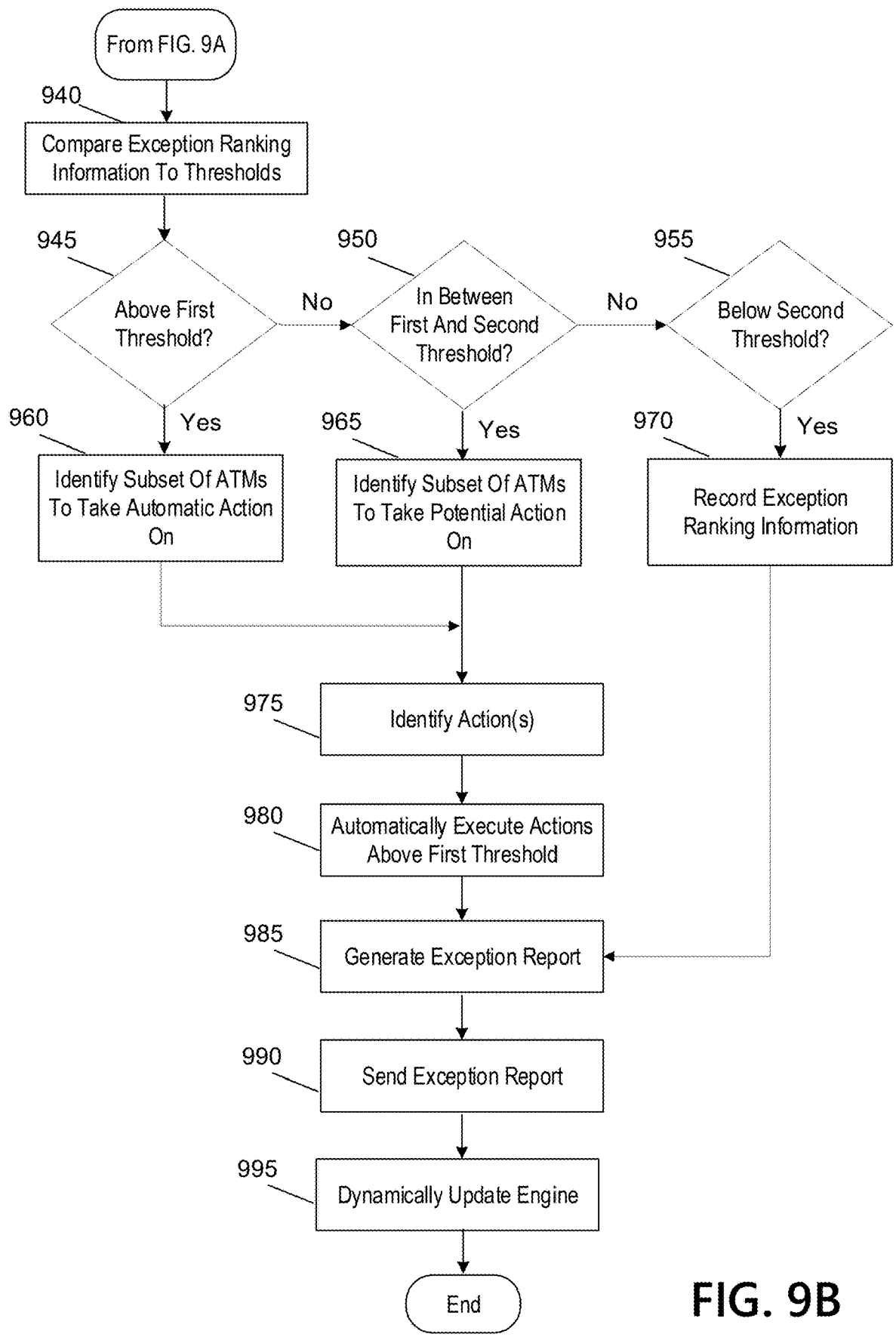

FIGS. 9A-B depict an illustrative method for implementing one or more aspects described herein. At step 905, a computing platform having at least one processor, a communication interface, and memory may configure an exception mapping table. At step 910, the computing platform may receive one or more exception codes. At step 915, the computing platform may identify whether any of the one or more exception codes have a corresponding exception type. At step 920, if the computing platform identifies a missing exception type, the computing platform may proceed to step 925. If the computing platform does not identify any missing exception types, the computing platform may proceed to 935.

At step 925, the computing platform may create a new exception type for any missing exception types. At step 930, the computing platform dynamically update the exception mapping table based on the newly created exception type. At step 935, the computing platform may compile exception ranking information.

Referring to FIG. 9B, at step 940, the computing platform may compare the exception ranking information to one or more thresholds. At step 945, if an exception code is above a first threshold, the computing platform may proceed to step 960. At step 950, if an exception code is between the first threshold and a second threshold that is lower than the first threshold, the computing platform may proceed to step 965. At step 955, if an exception code is below the second threshold, the computing platform may proceed to step 970.

At step 960, based on an exception code being above the first threshold, the computing platform may identify a subset of ATM's to take automatic action on. At step 965, based on an exception code being below the first threshold and above the second threshold, identify a subset of ATMs to take potential action on. At step 970, based on an exception code being below the second threshold, the computing platform may record the exception information.

At step 975, the computing platform may identify one or more actions to remediate one the exception codes that were above the first threshold and/or the second threshold. At step 980, the computing platform may automatically execute the action(s) that correspond to exceptions that were above the first threshold. At step 985, the computing platform may generate an exception report. At step 990, the computing platform may send the exception report to enterprise computing device 105. At step 995, the computing platform may dynamically update an engine associated with the computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   configure an exception mapping table to match an exception code to a corresponding exception type;
   identify whether a particular exception code corresponds to an exception type;
   based on determining that the particular exception code does not correspond to the exception type:
      create a new exception type for the particular exception code; and
      dynamically update the exception mapping table based on the new exception type;
   receive one or more exception codes associated with one or more automated teller machines (ATMs);
   map the one or more exception codes to one or more corresponding exception types;
   compile exception ranking information, wherein the exception ranking information ranks the one or more exception codes based on a total number of each one of the one or more exception codes;
   identify a subset of ATMs, wherein the identifying is based on a top three ranked exception codes of the one or more exception codes; and
   identify one or more actions to remediate issues associated with the top three ranked exception codes; and
   automatically execute the one or more actions, by sending one or more commands, that when received by the subset of ATMs, direct the subset of ATMs to automatically execute the one or more actions.

2. The computing platform of claim 1, wherein the memory stores additional computer-readable instructions that, when executed by the at least one processor, cause the computing platform to:
   generate an exception report, wherein the exception report comprises the exception ranking information, the subset of ATMs, and the one or more actions.

3. The computing platform of claim 2, wherein the memory stores additional computer-readable instructions that, when executed by the at least one processor, cause the computing platform to:
   send, to an enterprise computing device, the exception report and one or more commands directing the enterprise computing device to display the exception report, wherein sending the one or more commands directing the enterprise computing device to display the exception report causes the enterprise computing device to display the exception report.

4. The computing platform of claim 1, wherein the memory stores additional computer-readable instructions that, when executed by the at least one processor, cause the computing platform to:
   compare a total number of each exception code of the one or more exception codes to a first threshold; and
   based on the total number exceeding the first threshold:
      identify the one or more actions to remediate issues associated with the exception codes; and
      automatically execute the one or more actions.

5. The computing platform of claim 4, wherein the memory stores additional computer-readable instructions that, when executed by the at least one processor, cause the computing platform to:
   compare the total number to a second threshold that is lower than the first threshold; and
   based on the total number being equal to or below the first threshold but exceeding the second threshold:
      identify the one or more actions; and
      not automatically execute the one or more actions.

6. The computing platform of claim 1, wherein the creating is performed using a manual process at an enterprise computing device.

7. The computing platform of claim 1, wherein the creating is performed by an automated process using a trained model.

8. The computing platform of claim 1, wherein the memory stores additional computer-readable instructions that, when executed by the at least one processor, cause the computing platform to:
   update, using a dynamic feedback loop and based on the configuring, the mapping, the compiling, the identifying the subset of ATMs, and the identifying the one or more actions, an engine associated with the computing platform.

9. A method comprising:
   at a computing platform comprising at least one processor, a communication interface, and memory:
      configuring an exception mapping table to match an exception code to a corresponding exception type;
      identifying whether a particular exception code corresponds to an exception type;
      based on determining that the particular exception code does not correspond to the exception type:
         creating a new exception type for the particular exception code; and
         dynamically updating the exception mapping table based on the new exception type;
      receiving one or more exception codes associated with one or more automated teller machines (ATMs);
      mapping the one or more exception codes to one or more corresponding exception types;
      compiling exception ranking information, wherein the exception ranking information ranks the one or more exception codes based on a total number of each one of the one or more exception codes;

identifying a subset of ATMs, wherein the identifying is based on a top three ranked exception codes of the one or more exception codes; and identifying one or more actions to remediate issues associated with the top three ranked exception codes; and automatically executing the one or more actions, by sending one or more commands, that when received by the subset of ATMs, direct the subset of ATMs to automatically execute the one or more actions.

10. The method of claim 9, further comprising:

generating an exception report, wherein the exception report comprises the exception ranking information, the subset of ATMs, and the one or more actions; and sending, to an enterprise computing device, the exception report and one or more commands directing the enterprise computing device to display the exception report, wherein sending the one or more commands directing the enterprise computing device to display the exception report causes the enterprise computing device to display the exception report.

11. The method of claim 9, further comprising:

comparing a total number of exception codes to a first threshold; and based on the total number of exception codes exceeding the first threshold:

identifying the one or more actions to remediate issues associated with the exception codes; and automatically executing the one or more actions.

12. The method of claim 11, further comprising:

comparing the total number of exception codes to a second threshold that is lower than the first threshold; and based on the total number of exception codes being equal to or below the first threshold but exceeding the second threshold:

identifying the one or more actions; and not automatically executing the one or more actions.

13. The method of claim 9, wherein the creating is performed using a manual process at an enterprise computing device.

14. The method of claim 9, wherein the creating is performed by an automated process using a trained model.

15. The method of claim 9, further comprising:

updating, using a dynamic feedback loop and based on the configuring, the mapping, the compiling, the identifying the subset of ATMs, and the identifying the one or more actions, an engine associated with the computing platform.

16. One or more non-transitory computer-readable storing instructions that, when executed by a computing platform comprising at least one processor, a communication interface, and memory, cause the computing platform to:

configure an exception mapping table to match an exception code to a corresponding exception type;

identify whether a particular exception code corresponds to an exception type;

based on determining that the particular exception code does not correspond to the exception type:

create a new exception type for the particular exception code; and dynamically update the exception mapping table based on the new exception type;

receive one or more exception codes associated with one or more automated teller machines (ATMs);

map the one or more exception codes to one or more corresponding exception types;

compile exception ranking information, wherein the exception ranking information ranks the one or more exception codes based on a total number of each one of the one or more exception codes;

identify a subset of ATMs, wherein the identifying is based on a top three ranked exception codes of the one or more exception codes; and identify one or more actions to remediate issues associated with the top three ranked exception codes; and automatically execute the one or more actions, by sending one or more commands, that when received by the subset of ATMs, direct the subset of ATMs to automatically execute the one or more actions.

* * * * *